June 17, 1930.  L. Y. SPEAR ET AL  1,764,902
TRACTION VEHICLE
Filed Aug. 2, 1926  6 Sheets-Sheet 4
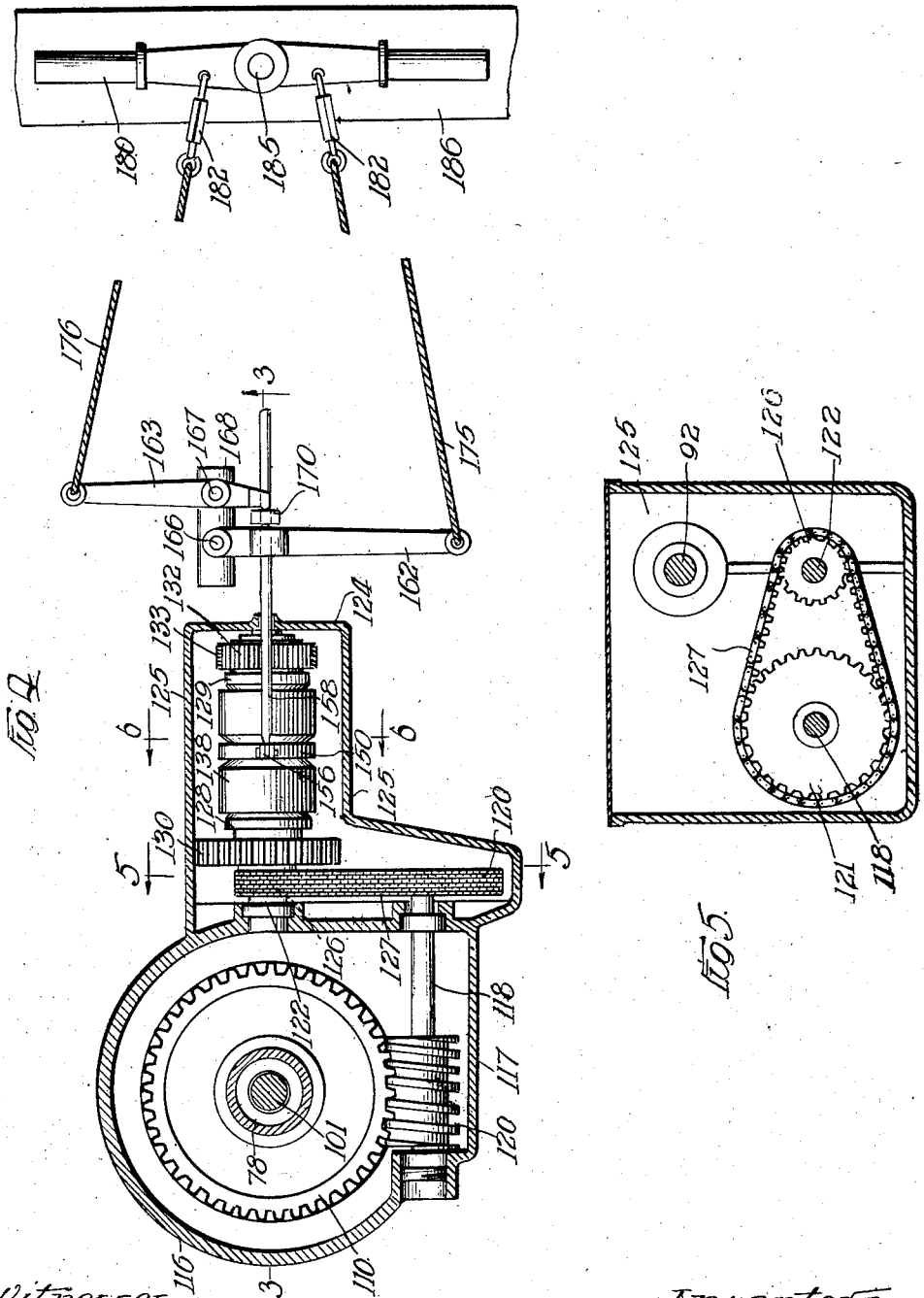

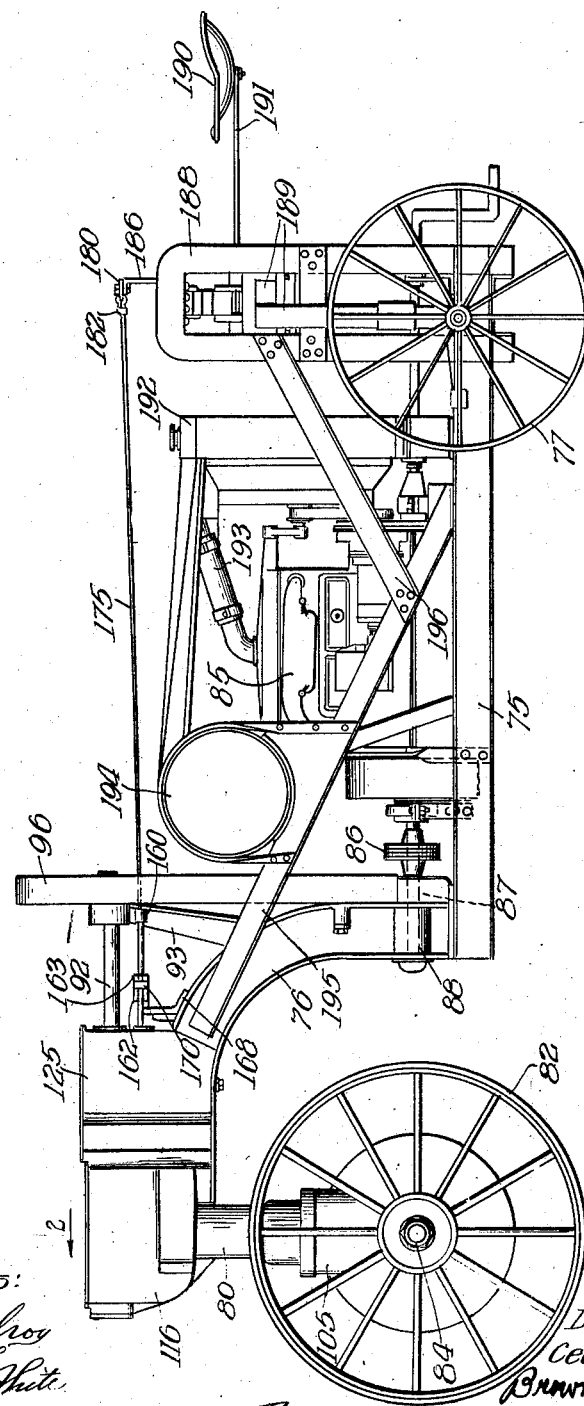

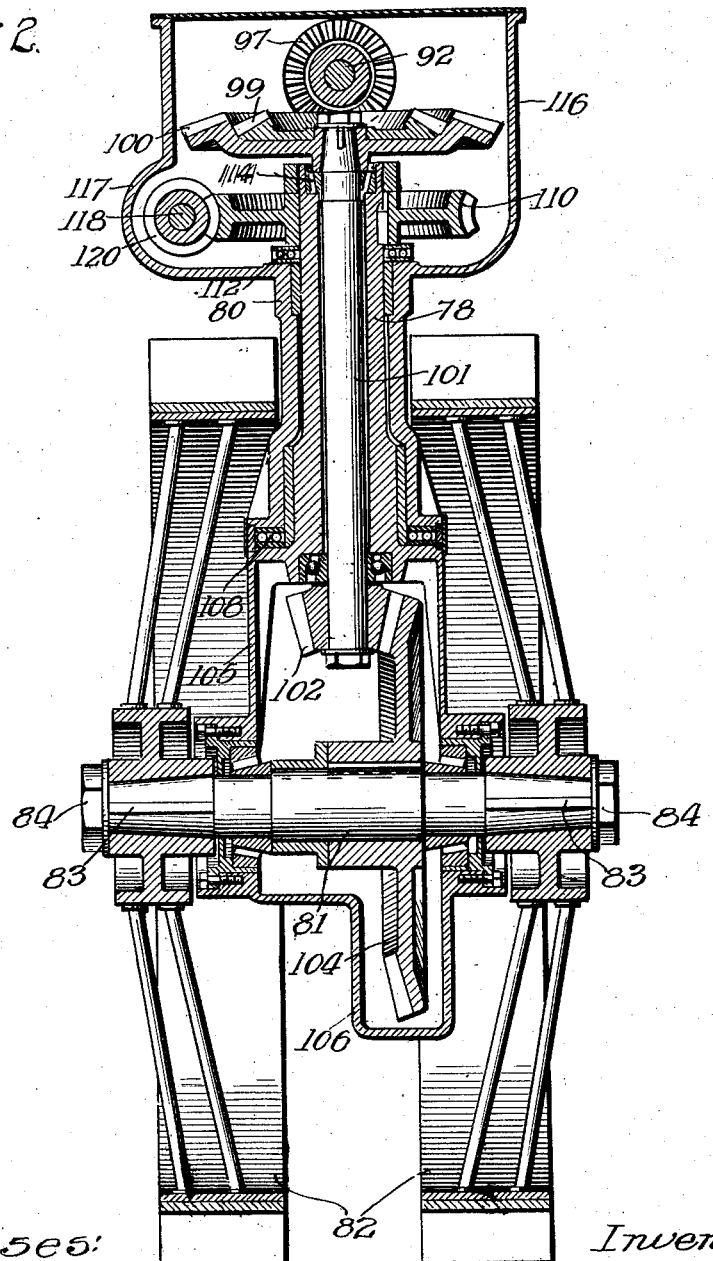

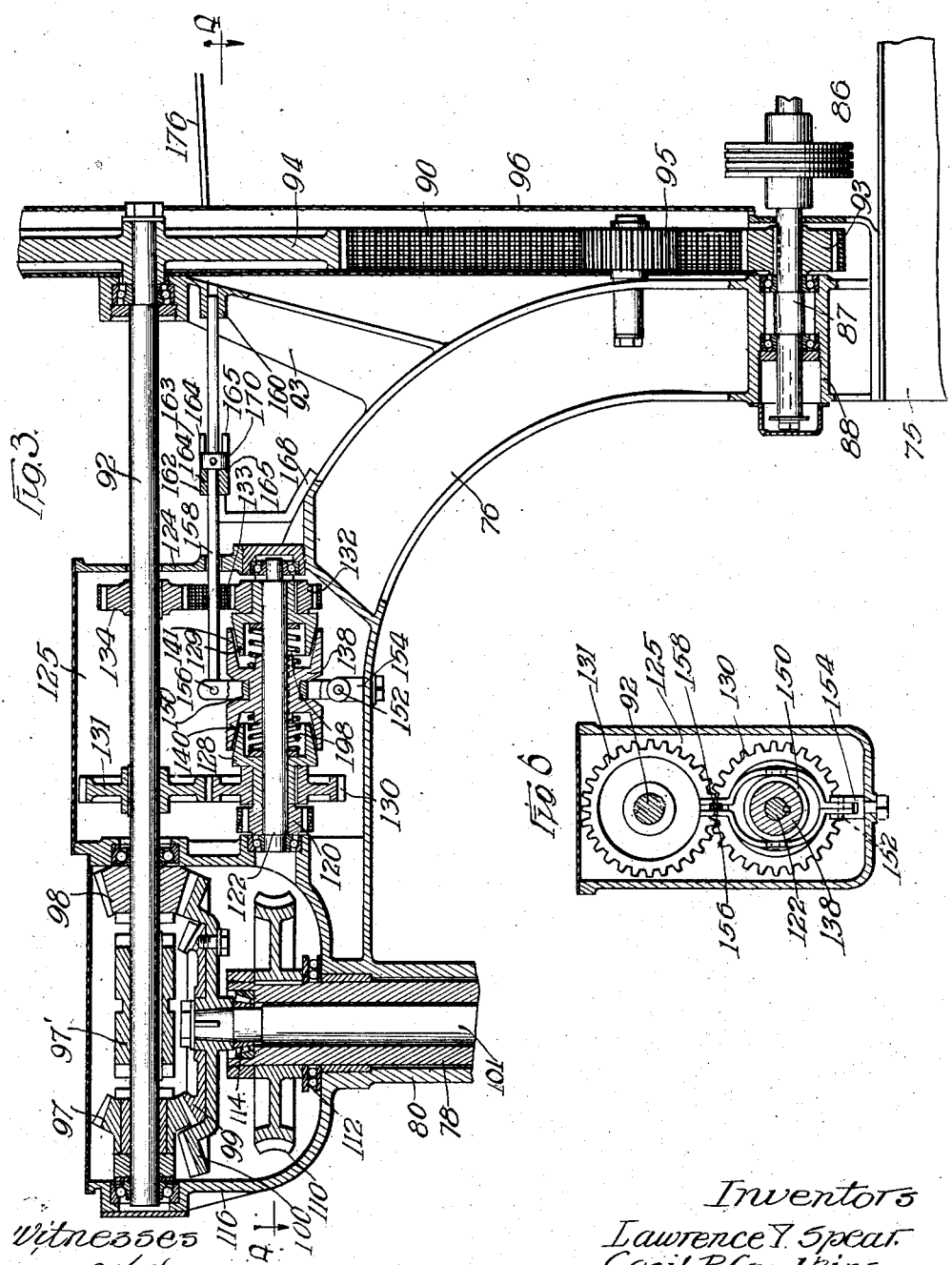

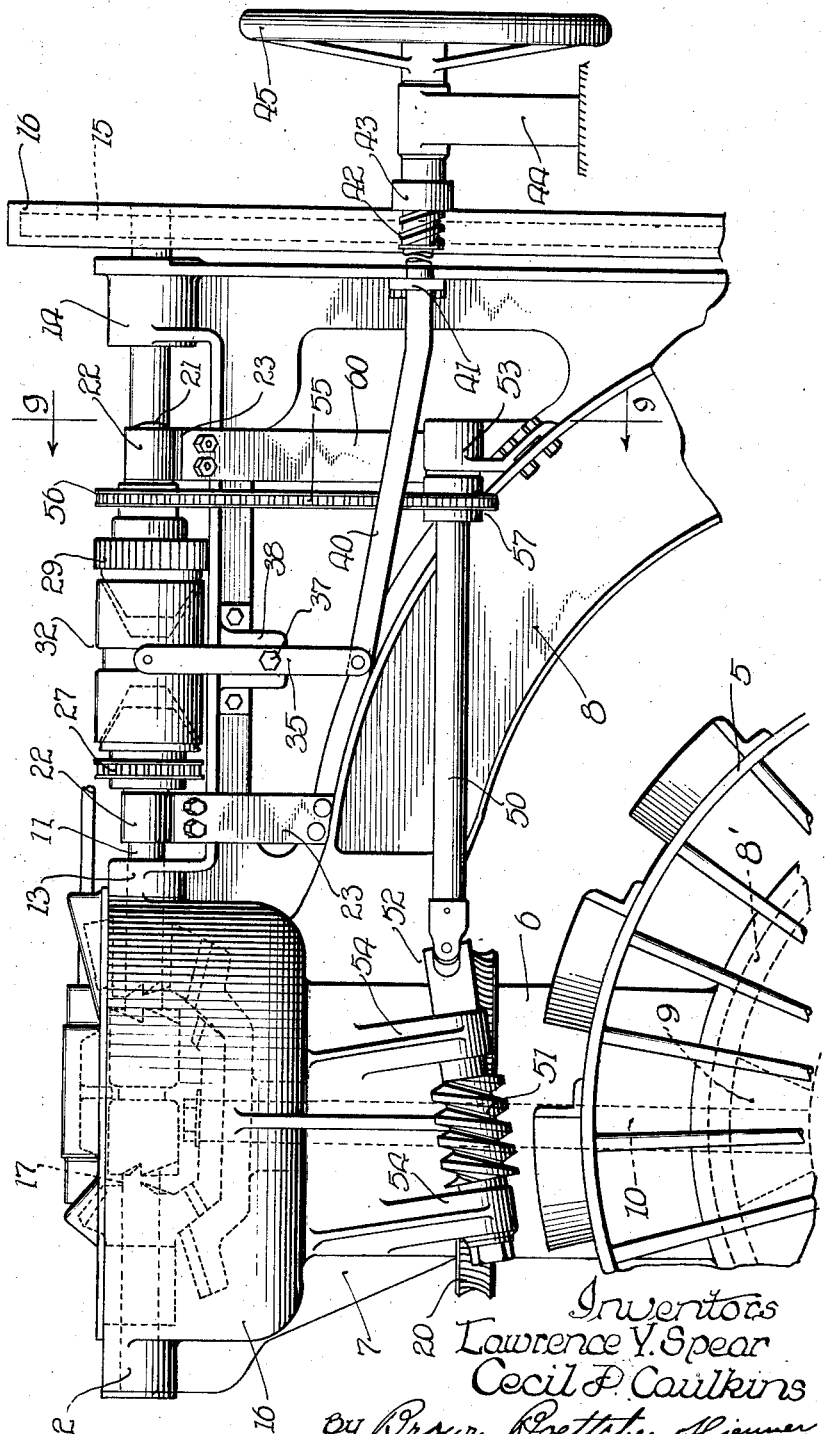

June 17, 1930.  L. Y. SPEAR ET AL  1,764,902
TRACTION VEHICLE
Filed Aug. 2, 1926   6 Sheets-Sheet 6

Inventors
Lawrence Y. Spear
Cecil P. Caulkins
By Brown, Boettcher & Siemer
Att'ys Patented June 17, 1930

1,764,902

UNITED STATES PATENT OFFICE

LAWRENCE Y. SPEAR AND CECIL P. CAULKINS, OF NEW LONDON, CONNECTICUT, ASSIGNORS TO GENERAL ORDNANCE CORPORATION, OF NEW YORK, N. Y., A CORPORATION OF NEW YORK

TRACTION VEHICLE

Application filed August 2, 1926. Serial No. 126,518.

Our invention relates to traction vehicles and more particularly to an improved steering and controlling mechanism therefor.

While the particular embodiment which we shall describe in connection with the accompanying drawings is especially adapted for use with a vehicle of the general type shown and described in Gregory C. Davison Patent No. 1,560,043, November 3, 1925, it is to be understood that the present invention is not limited to such use, but may be employed in all similar work.

The invention contemplates an improved mechanism for controlling the movement of the vehicle in a novel, simple and convenient manner and for turning and changing the direction of movement of the vehicle quickly, conveniently and easily notwithstanding relatively heavy loads and varying ground conditions. By the use of our invention the vehicle may be turned as desired or even completely reversed by the power derived from the motor. The control of the turning and reversing mechanism may be through the usual hand or steering wheel of the vehicle or by means of reins or a line. The invention makes the tractor more suitable for use with agricultural implements and better adapts the same to such other uses to which it is placed. Clutch elements are employed between the driving motor and the tractor wheels and these are controlled by the hand or steering wheel or by reins or a line as already pointed out to direct the tractor quickly to either side. When the clutch elements are released the application of power for the purpose of steering or reversing the vehicle is disconnected and the vehicle assumes its normal straight ahead course. Where the steering application is to the drive or traction wheels of the vehicle as it is in the embodiment selected for illustration the mechanism is adapted to turn said wheels to reverse the direction of movement of the vehicle. Exceedingly quick and sharp turns are made possible and the manipulation of the vehicle is better adapted to the uses to which it is put and conditions to which it is subjected.

The mechanism of our invention is simple and compact in construction, its operation is simple, effective and easy, it can be provided at a comparatively low cost and can be easily installed. It is also conveniently accessible.

Certain structural features of our invention are novel and important, and are made the subject matter of some of the appended claims.

In the drawings:

Figure 1 is a side elevational view of a tractor embodying the invention.

Fig. 2 is a vertical section on line 2—2 of Fig. 1.

Fig. 3 is a fragmentary vertical section on line 3—3 of Figure 4.

Fig. 4 is a horizontal section on line 4—4 of Fig. 3.

Fig. 5 is a vertical detail section on line 5—5 of Fig. 4.

Fig. 6 is a similar section on line 6—6 of Fig. 4.

Fig. 7 is a fragmentary side elevational view of a tractor embodying a modification of the invention.

Figure 8:
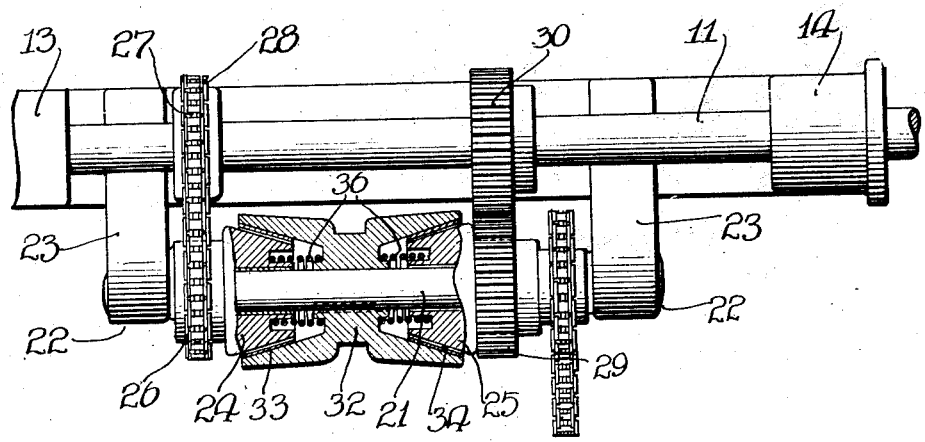
Fig. 8 is a fragmentary plan view partially in section of the steering take-off connection shown in Fig. 7.

In the embodiment of the invention shown in Figs. 1 to 6, the tractor is generally of the type shown and described in the co-pending application of Gregory C. Davison, Ser. No. 398,134 filed July 22, 1920, which has resulted in Patent No. 1,511,873, granted October 14, 1924, and comprises a relatively low main frame 75 having an arched arm 76 at one end and wheels 77 near the opposite end.

A vertical post or wheel stock 78 rotatably journaled at its upper end in bearing head 80 at the free end of arm 76 carries axle 81 upon the opposite ends of which wheels 82 are fixed as by suitable feathers 83 and nuts 84. Axle 81 is rotatably journaled in bearings mounted in the depending encasing portion of the wheel stock. Wheels 82 are driven or rotated about a horizontal axis to drive the vehicle, by a motor 85 suitably mounted upon main frame 75, and turn laterally with wheel stock 78 about the vertical axis of same to steer the vehicle and reverse the direction of movement as desired. The fly wheel end of motor 85 is provided with a clutch 86 and the forward end of engine clutch shaft 87 is rotatably journaled in a bearing 88 at the main frame end of arm 76. A driving chain 90 drivingly connects shaft 87 with a substantially parallel uni-directional driving shaft 92 journaled at one end in bearings carried by the flared gear encasing portion of head 80 and at the other end in a bearing carried by arm 93, projecting from arched arm 76. Chain 90 which is preferably of the silent type is trained about a relatively small sprocket 93 on shaft 87 and a relatively large sprocket 94 on shaft 92 providing a substantial speed reduction from shaft 87 to shaft 92. An adjustable idler sprocket 95 meshing with chain 90 is provided for taking up slack in the chain as desired.

High and low speed bevel driving pinions 97—98 loosely mounted upon shaft 92, are in constant mesh with high and low speed bevel driving gears 99 and 100, respectively, fixed upon the upper end of a shaft 101. Shaft 101 extends vertically through and is rotatably journaled in wheel stock or post 78. A shipper or sleeve 97' fixed upon shaft 92 against rotation relative thereto is slidable longitudinally therealong to connect the high or low speed pinion 97 or 98 to shaft 92 and secure a corresponding speed of the tractor as desired. A relatively small bevel pinion 102 fixed upon the lower end of shaft 101 meshes with and drives a relatively large bevel gear 104 fixed upon axle 81 and thereby the drive wheels 82 through said connection. Yoke 78 is enlarged at 105 below head 80 and serves with a separate lower portion 106 clamped or otherwise secured thereto, to encase the driving connections between shaft 101 and axle 81. A thrust bearing or washer 108 is arranged between the lower edge of head 80 and the top of enlarged portion 105 of yoke 78.

Fixed upon the upper revolvably mounted end of post or wheel stock 78 and encased in the encasing portion 116 of head 80 is a steering worm gear 110, between which and post 78 a thrust washer or bearing 112 is arranged. The upper end of shaft 101 is journaled in a bearing 114 interposed between the upper counterbored end of post 78 and the depending hub of bevel drive gear 100. The upper enlarged encasing portion 116 of head 80 is provided with a lateral pocket 117 through which a worm shaft 118 is arranged and journaled adjacent its ends in bearings mounted in the walls of the enlarged portion of head 80. Shaft 118 is provided with a steering worm 120 which engages or meshes with worm wheel 110 fixed on post 78. Shaft 118 is also provided with a sprocket wheel 121 fixed thereupon. A shaft 122 arranged substantially parallel with shaft 118 is journaled at one end in one of the walls of the enlarged encasing portion of head 80. The other end of said shaft is journaled in an end wall 124, which end wall 124 projects upwardly from arm 76 and serves with side walls 125 to encase or house the steering take-off connection from drive shaft 92. Shaft 122 is provided with a sprocket wheel 126 fixed thereupon, and a link belt chain 127 trained around sprockets 121 and 126 connects shafts 122 and 118.

Loosely mounted on shaft 122 are a pair of opposed cone clutch members 128—129. Fixed upon the projecting hub of cone clutch member 128 is a gear 130 which meshes with a gear 131 fixed upon shaft 92. Fixed upon the projecting hub of cone clutch member 129 is a sprocket wheel 132 and a suitable chain 133 trained about said sprocket wheel 132 and a sprocket wheel 134 fixed upon shaft 92 drivingly connects shaft 92 and cone clutch member 129.

A clutch sleeve or shipper 138 is splined, keyed or feathered upon clutch shaft 122 for longitudinal movement between cone clutch members 128, 129. The splined or feathered connection between sleeve or shipper 138 and shaft 122 permits longitudinal movement of the sleeve along the shaft, and at the same time prevents relative rotation therebetween. Clutch sleeve 138 is recessed at its opposite ends and provided with internal conical surfaces 140—141 for cooperation or frictional engagement with the external conical surfaces of cone clutch members 128—129. The respective conical surfaces may be lined and covered with friction material as shown in Fig. 2. This is not essential, however. I find, for example, that by making the shipper 138 of a softer material, such as brass, for example, the desired frictional engagement is had. It will now be apparent that shifting of shipper 138 to frictionally engage internal conical surface 140 with cone clutch member 128 connects shaft 142 for rotation by cone clutch member 128, and that shifting of shipper 138 to frictionally engage surface 141 with cone clutch member 129 connects shaft 122 for rotation by said cone clutch member 129. Shipper 138 has a neutral position between clutch members 128—129 in which position neither of the clutch members 128—129 is engaged and shaft 122 remains idle in spite of the rotation of clutch member 128—129 in opposite directions. Coiled springs 198 between the opposite ends of the shipper 138 and the respective cone clutch members normally hold the shipper in its central or neutral position.

A clutch shifting yoke 150 engaging in an annular groove in the periphery of shipper 138 and pivoted at 152 to a lug 154 carried by arm 76 is provided for shifting shipper 138 along shaft 122 as desired. Clutching of clutch member 128 to shaft 122 causes said shaft to rotate in a direction opposite that of shaft 92. Clutching of clutch member 129 to shaft 122 causes rotation of said shaft in the same direction as shaft 92. The upper end of yoke 150 is pivotally connected at 156 to the end of a longitudinally movable rod 158, which rod extends back through wall 124 and is slidably mounted at its opposite end in an opening in boss 160 projecting from arm 93. A pair of levers 162—163, each of which comprises an upper arm 164 and a lower arm 165 are pivoted at 166 and 167 to a bracket member 168 mounted upon arm 76. Rod 158 extends between the upper and lower arms of each of the levers 162—163 and is provided with a block 170 fixed upon same and engaging between levers 162 and 163. The free ends of levers 162—163 are connected preferably by flexible lines 175—176, respectively, although rods or other suitable connections may of course be employed, to a pivoted lever or handlebar 180, said lines 175—176 being connected through suitable connectors 182 with lever 180 at opposite sides of the intermediate pivotal mounting 185 of said lever upon mounting bracket 186, which mounting bracket is in this particular instance mounted upon the upright frames 188 in which the axle 189 is mounted.

In the particular tractor shown, seat 190 is carried by a spring 191 which extends rearwardly from frames 188. This positions the seat to the rear of the tractor where the operator is within easy reach of the controls and where he can also readily adjust plows and other implements which he may be drawing back of the tractor. For cultivating, the seat may be positioned over the radiator to permit ready control and free unobstructed view of the tractor as it advances. Radiator 192 is arranged at the seat end of motor 85 and communication between the radiator and engine is had through a connection 193. A fuel tank is indicated at 194 and 195—196 designate braces between arm 76, main frame 75 and axle frames 188.

From the foregoing it will now be apparent that when the shipper 138 is in the position shown, there will be no rotation imparted to shafts 122 and 118, and the vehicle will continue in its straight ahead movement. By turning the single control lever about its pivot 185 according to the turn desired, the desired clutch member 128—129 is clutched to shaft 122 to rotate shafts 122 and 118 and turn the wheel stock 78 about its vertical axis through the co-operating worm 120 and worm wheel 110 to steer the vehicle. This arrangement permits quick and easy steering and reversing of the vehicle regardless of the load and regardless of ground conditions. A sharp turn is permissible with ease and quickness. By turning the wheel stock through 180° through this power take-off steering connection the movement of the vehicle can be reversed by power derived from the engine. Quick and easy turning of wheels 82 through a complete circle i. e. through a complete 360° is permitted.

Figure 9:
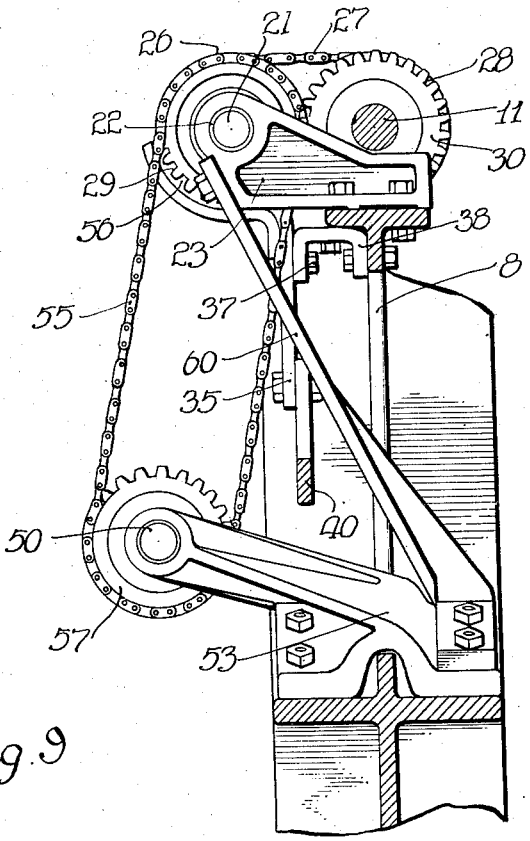
Fig. 9 is a vertical section on line 9—9 of Fig. 7.

In the embodiment shown in Figures 7, 8 and 9, the combined driving and steering wheels 5 of the tractor are carried by an axle (not shown) mounted in the yoke or wheel stock 6. The upper end of yoke or wheel stock 6 is journaled in a bearing head 7 at the end of the arched frame section 8. As before, the entire yoke member or wheel stock with the wheels 5 and axle carrying the same is adapted to be turned about the vertical axis of this journal to steer the vehicle or reverse the direction of movement of the same. The main driving gear 8' splined or otherwise fixed upon the axle carried by yoke member 6, meshes with a driving pinion 9 fixed upon the lower end of a vertical intermediate driving shaft 10 arranged axially through the member 6 as shown. It is through these co-operating gears 9—10 that the drive is transmitted at a relatively great reduction to the wheels 5.

A horizontal intermediate driving shaft 11 journaled in bearings 12, 13 and 14 carried by the arched frame section 8, is driven from the engine or motor of the vehicle through a driving chain or other suitable driving member 15, encased in a suitable casing 16. The engine or motor (not shown) is preferably mounted upon the chassis or running gear frame of the vehicle, although of course it may be otherwise carried or positioned. Rotation is transmitted from the forward end of shaft 11 to the vertical intermediate shaft 10 through change speed gearing 17 encased in a dust and oil tight casing carried by the bearing head 7 at the end of the arched frame section 8. Fixed upon yoke member 6 adjacent the lower end of bearing head 7 in which the yoke is journaled is a steering worm gear 20.

The provision for turning or revolving the steering head 6 by power derived from the motor or engine of the vehicle comprises, in this case, a clutch shaft 21 (Figure 8) arranged parallel to shaft 11 and mounted at its opposite ends in bearing members 22—22, each of which is carried by a bracket member 23 mounted in an upright position upon the arched frame section 8. A pair of cone clutch members 24—25 are loosely mounted upon the shaft 21. The projecting hub portion of the cone clutch member 24 carries a sprocket wheel 26. A chain 27 trained over this sprocket wheel 26 and over a sprocket wheel 28 fixed upon shaft 11 rotates the cone clutch member 24 continuously during rotation of shaft 11 in the same direction in which shaft 11 is rotating.

The projecting hub portion of cone clutch member 25 carries a spur gear 29 which spur gear 29 meshes with a spur gear 30 fixed upon shaft 11. These two intermeshing gears 29—30 drive cone clutch member 25 in a direction opposite to the direction of rotation of shaft 11. Clutch member 25, like clutch member 24, is rotated continuously during rotation of shaft 11.

A clutch sleeve or shipper 32 is splined or feathered upon shaft 21 for sliding longitudinal movement between cone clutch members 24—25. The splined or feathered connection between sleeve 32 and shaft 21 permits longitudinal sliding movement of the sleeve along the shaft, but at the same time prevents relative rotation therebetween. Clutch member 32 is provided at its opposite ends with internal conical friction surfaces 33 and 34 adapted for co-operation or frictional engagement with the external conical surfaces of cone clutch members 24—25 respectively. Clutch sleeve 32 and internal conical friction surfaces 33 and 34 are so proportioned that when the sleeve 32 occupies a central position between the clutch members 24 and 25 as shown, there will be no frictional engagement with either of said clutch members, allowing the clutch shaft 21 to remain idle in spite of rotation of the clutch members 24 and 25 in opposite directions.

A clutch shifter yoke 35 is provided for moving sleeve 32 longitudinally along shaft 31 to bring either the internal conical surface 33 into engagement with the clutch member 24 or the internal conical surface 34 into engagement with clutch member 25 to clutch either of the rotating members 24 or 25 to the clutch shaft 21 to rotate the shaft in the desired direction. Clutch member 24 rotating in the same direction as shaft 11 upon being clutched to shaft 21 will cause it to rotate likewise, while clutch member 25 rotating in the opposite direction upon being clutched to shaft 21 will set up rotation of said shaft in the opposite direction. Coiled springs 36 between the clutch members 24 and 25 and sleeve 32 normally maintain sleeve 32 in its central or neutral position. Shifter yoke 35 is pivoted within its length as shown at 37 to a bracket member 38. The lower end of yoke 35 is pivotally connected to the end of a longitudinally movable steering clutch rod 40. This rod 40 extends back through a guide 41 and carries a clutch operating screw 42 engaging in a clutch operating nut or internally threaded hub 43 just forward of a steering wheel mounting bracket 44, carried by the chassis or running gear frame of the vehicle. Rotation of steering wheel 45 threads screw 42 into or from nut 43 with the result that rod 40 is shifted longitudinally in a corresponding direction to swing the yoke member 35 about its pivot 37. This pivotal movement of yoke 35 moves sleeve 32 along shaft 21 to clutch either the clutch member 24 or the clutch member 25 thereto depending of course upon the direction of rotation of the steering wheel 45.

A steering shaft 50 having driving connection with a worm 51 through a universal joint 52 is journaled at its opposite end in a bearing bracket 53 mounted upon the arched frame section 8 of the tractor. The opposite ends of the worm itself are supported in arms 54—54 extending from the head 7 of the frame section 8. A driving chain 55 trained over sprockets 56 and 57 fixed upon clutch shaft 21 and steering shaft 50 respectively rotates the shaft 50 in the same direction in which the shaft 21 is rotated, which direction is, of course, dependent upon which of the clutch members 24 or 25 the shipper 32 is in engagement with. Steering worm 51 engages or meshes with steering worm gear 20 fixed upon the yoke or wheel stock 6, so that upon rotation of shaft 50 yoke member 6 will be correspondingly rotated to turn the driving wheel 5 about the axis of the yoke member to steer the tractor. Reversing of the tractor may be had by a 180° rotation of the steering head about its vertical axis, although, of course, this is really immaterial insofar as the present invention is concerned. Bearing bracket 23 at the main frame end of shaft 21 is braced by bracing member 60 extending diagonally (Figure 9) between it and bracket member 53.

In view of the foregoing description and the explained operation of the embodiment shown in Figures 1 to 6 inclusive, it is not believed that a particularized description of the operation of the embodiment shown in Figures 7, 8 and 9, is necessary.

The combined driving, steering and reversing wheels need not be at the forward end of the tractor. The description of one end as the forward end and the other as the rear is simply to completely describe the particular embodiment shown. The various parts of the tractor may be reversed and interchanged within the scope of our present invention.

We claim:

1. In combination, a main frame having a bearing head, a wheel frame having a hollow spindle rotatably mounted in said bearing head, a wheel associated with said wheel frame, a worm gear fixed upon said wheel frame, a steering shaft provided with a worm meshing with said worm gear, a drive shaft, a normally idle driven shaft, a pair of driving members on said driven shaft, drive means between the drive shaft and said driving members for driving said members in opposite directions, a sprocket chain connecting said driven shaft to said steering shaft, means for fixing either of said members upon said driven shaft to rotate the steering shaft accordingly, a second driven shaft projecting through said spindle, a bevel gear on each end of said second driven shaft, a gear fixed to said wheel meshing with one of said bevel gears, a driving gear mounted on said drive shaft, meshing with the other of said bevel gears, and control means for fixing said driving gear upon said drive shaft to rotate said wheel.

2. In a motor vehicle, the combination of a frame, a hollow wheel stock mounted to turn on a vertical axis in said frame, a worm wheel fixed on said wheel stock to turn same therewith, a driving motor, a uni-directional drive shaft driven by said motor, a clutch shaft having a pair of clutch elements driven in opposite directions by said drive shaft, a generally horizontal power steering shaft having direct driving connection at one end with said clutch shaft and a steering worm at its opposite end meshing directly with said worm wheel, means for selectively connecting said clutch elements with said clutch shaft, a bevel gear fixed to one drive wheel of the vehicle, a second drive shaft mounted in the hollow of said wheel stock substantially along the axis of rotation of said wheel stock and having gear connection with said first drive shaft, and a second bevel gear fixed to said second drive shaft meshing with said first bevel gear.

3. In a motor vehicle, the combination of a frame, a hollow wheel stock mounted to turn on a vertical axis in said frame, a driving member fixed on said wheel stock to turn same therewith, a driving motor, a uni-directional drive shaft driven by said motor, a clutch shaft in substantial parallelism with said drive shaft and having a pair of clutch elements, a gear and a sprocket fixed on said drive shaft, a second gear fixed on one clutch element and meshing with said first gear, a second sprocket fixed on the other clutch element, a chain belt connecting said sprockets, a generally horizontal power steering shaft having direct driving connection at one end with said clutch shaft and a driving member at its opposite end meshing directly with the driving member on the wheel stock, and means for selectively connecting said clutch elements with said clutch shaft.

In witness whereof, we hereunto subscribe our names this 27th day of July, 1926.

LAWRENCE Y. SPEAR.
CECIL P. CAULKINS.